United States Patent
Cheng

(10) Patent No.: US 7,144,262 B2
(45) Date of Patent: Dec. 5, 2006

(54) VERSATILE CONNECTOR FOR MOBILE TELEPHONE

(75) Inventor: Nai-Sheng Cheng, Hsinchu (TW)

(73) Assignee: Mobitek Communication Corp., Taipei (TW)

( * ) Notice: Subject to any disclaimer, the term of this patent is extended or adjusted under 35 U.S.C. 154(b) by 261 days.

(21) Appl. No.: 10/890,185

(22) Filed: Jul. 14, 2004

(65) Prior Publication Data

US 2006/0014563 A1   Jan. 19, 2006

(51) Int. Cl.
*H01R 13/66* (2006.01)
(52) U.S. Cl. .................................. 439/151; 439/218
(58) Field of Classification Search ............ 439/151, 439/217, 218, 682
See application file for complete search history.

(56) References Cited

U.S. PATENT DOCUMENTS 3,441,896 A * 4/1969 Hawkins .................... 439/107

* cited by examiner

*Primary Examiner*—Tho D. Ta
(74) *Attorney, Agent, or Firm*—Rosenberg, Klein & Lee

(57) ABSTRACT

A connector for easily connecting a peripheral to a mobile telephone that allows the peripheral to be oriented in at least two directions. The connector comprises a phone-side connector attached to a mobile telephone and a peripheral-side connector attached to the peripheral. The phone-side connector comprises a plurality of contacts which are duplicated adjacent to the contacts but in a reverse order. The peripheral-side connector also comprises a plurality of mating contacts which are duplicated adjacent to the contacts but in a reverse order. In this way, the phone-side connector and the peripheral-side connector can properly mate regardless of the orientation, either facing towards or away from the mobile phone user.

18 Claims, 13 Drawing Sheets

VERSATILE CONNECTOR FOR MOBILE TELEPHONE

BACKGROUND OF THE INVENTION

1. Field of the Invention

The present invention relates to an electrical connector. More specifically, the present invention discloses a versatile connector for a mobile telephone and mobile telephone peripherals that allows the peripheral to be connected to the telephone in different orientations.

2. Description of the Prior Art

Mobile telephones are an important and useful communication tool. More and more, people are relying on the convenience and portability of these electronic wireless telephones.

However, as strictly a telephone, the feature set of a standard mobile telephone is not sufficient to meet the demands of modern users.

Therefore, additional options must be added to the mobile phone in order to meet these ever increasing demands.

As a result, recent advances in telephone devices have added useful tools such as a camera to the mobile phones.

However, in order to be produced with the telephone, these tools are permanently built into the phone housing or a part of the telephone. Since they are in a fixed position, the usefulness of these tools is limited.

Therefore, there is need for an improve means of providing a connection between a peripheral and a mobile telephone that allows the peripheral to be oriented in multiple directions and thereby increasing the value of the peripheral.

SUMMARY OF THE INVENTION

To achieve these and other advantages and in order to overcome the disadvantages of the conventional method in accordance with the purpose of the invention as embodied and broadly described herein, the present invention provides a versatile connector for a mobile telephone and mobile telephone peripherals that allows the peripheral to be easily connected to the telephone in different orientations.

The present invention effectively and efficiently provides a means for easily connecting a peripheral to a mobile telephone. Furthermore, the connector of the present invention allows the peripheral to be oriented in at least two directions.

The connector of the present invention comprises a phone-side connector attached to a mobile telephone and a peripheral-side connector attached to the peripheral.

The phone-side connector comprises a plurality of contacts which are duplicated adjacent to the contacts but in a reverse order. The peripheral-side connector also comprises a plurality of mating contacts which are duplicated adjacent to the contacts but in a reverse order. In this way, the phone-side connector and the peripheral-side connector can properly mate regardless of the orientation, either facing towards or away from the mobile phone user.

As an example, if the peripheral is a removable camera module, the connector on the camera mates with the mobile phone connector in order to connect the two devices. Once the camera module is connected to the mobile telephone via the mating connectors, the camera module captures images or video data, which is then stored in the mobile telephone. In this orientation, the lens of the camera module points toward the mobile phone user. In this way, images or video data of the user or other objects within the viewable range of the camera are captured.

When it is desired to photograph or record video data of objects other than the user, the camera module is simple disconnected from the mobile telephone and rotated 180 degrees so that the camera is facing away from the screen of the mobile phone. In this way, a user can simply look at the screen in order to observe the correct aiming of the camera module.

In other embodiments of the present invention, the connector further comprises a means of identifying the orientation of the peripheral, for example 0 degrees rotation or 180 degrees rotation.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
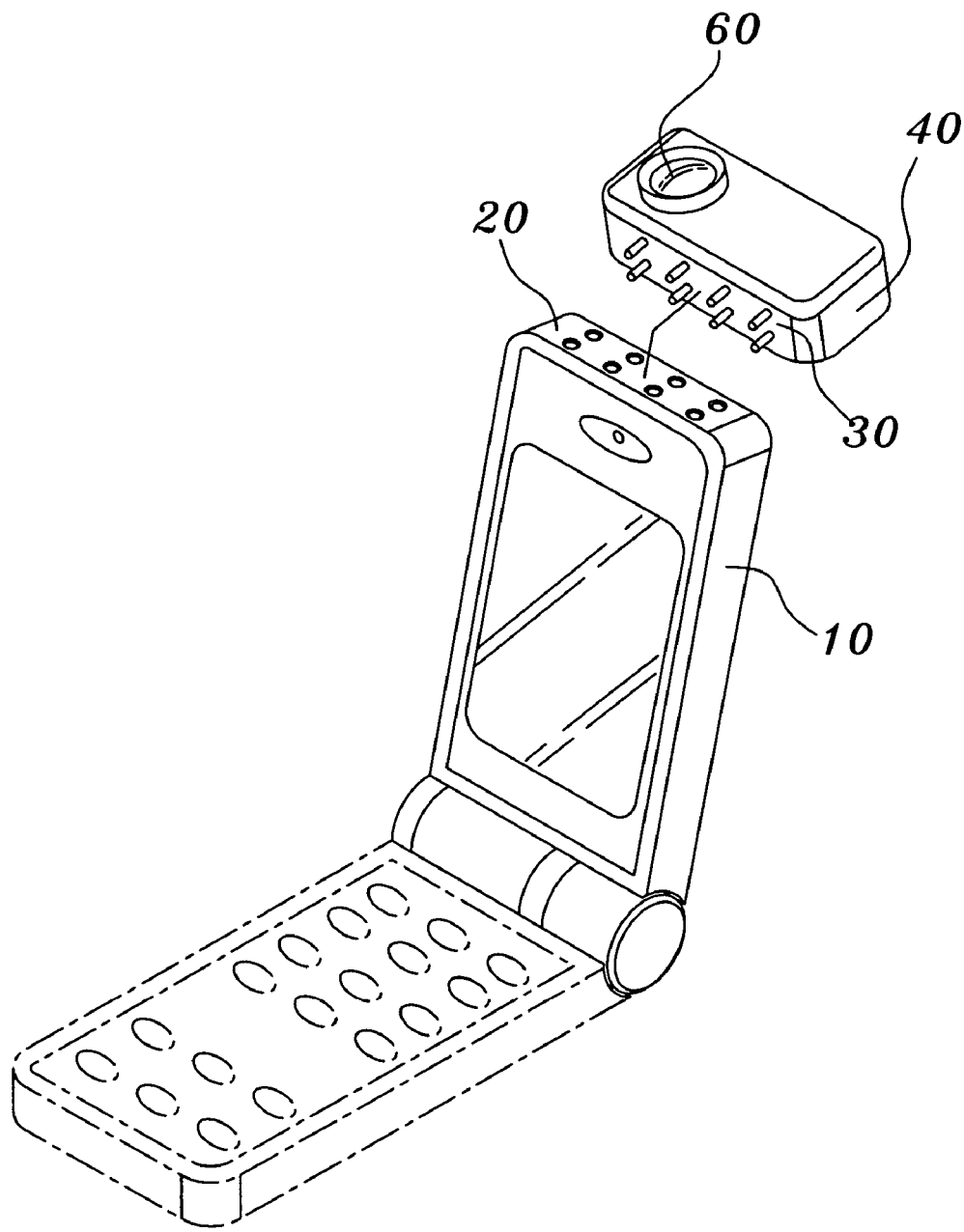
FIG. 1 is a 3 dimensional drawing of a mobile telephone and camera module connected via a versatile connector according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Refer to FIG. 1, which is a 3 dimensional drawing of a mobile telephone and camera module connected via a versatile connector according to an embodiment of the present invention.

As shown if FIG. 1, a mobile telephone 10 comprises a phone connector 20 for receiving a camera connector 30 of a camera module 40. The phone connector 20 and the camera connector 30 are mating connectors. For example, the phone connector 20 can be a female receptacle type connector and the camera connector 30 a male plug type connector. Alternatively, the phone connector 20 can be a male plug type connector and the camera connector 30 can be a female receptacle type connector.

For convenience when the camera is not attached to the mobile phone 10, it is preferable that the camera connector 30 is of the female receptacle type connector so that prongs from a male plug type connector do not protrude or extend from the body of the cellular phone 10. However, either configuration can be utilized depending upon requirements.

Once the camera module 40 is connected to the mobile telephone 10 via the mating connectors 20, 30, the camera module 40 captures images or video data, which is then stored in the mobile telephone 10. In the orientation as shown in FIG. 1, the lens 60 of the camera module 40 points toward the mobile phone user. In this way, images or video data of the user or other objects within the viewable range of the camera are captured.

For example, when the camera is connected in this orientation, the camera module 40 and mobile telephone 10 can act as a video conferencing device.

Figure 2:
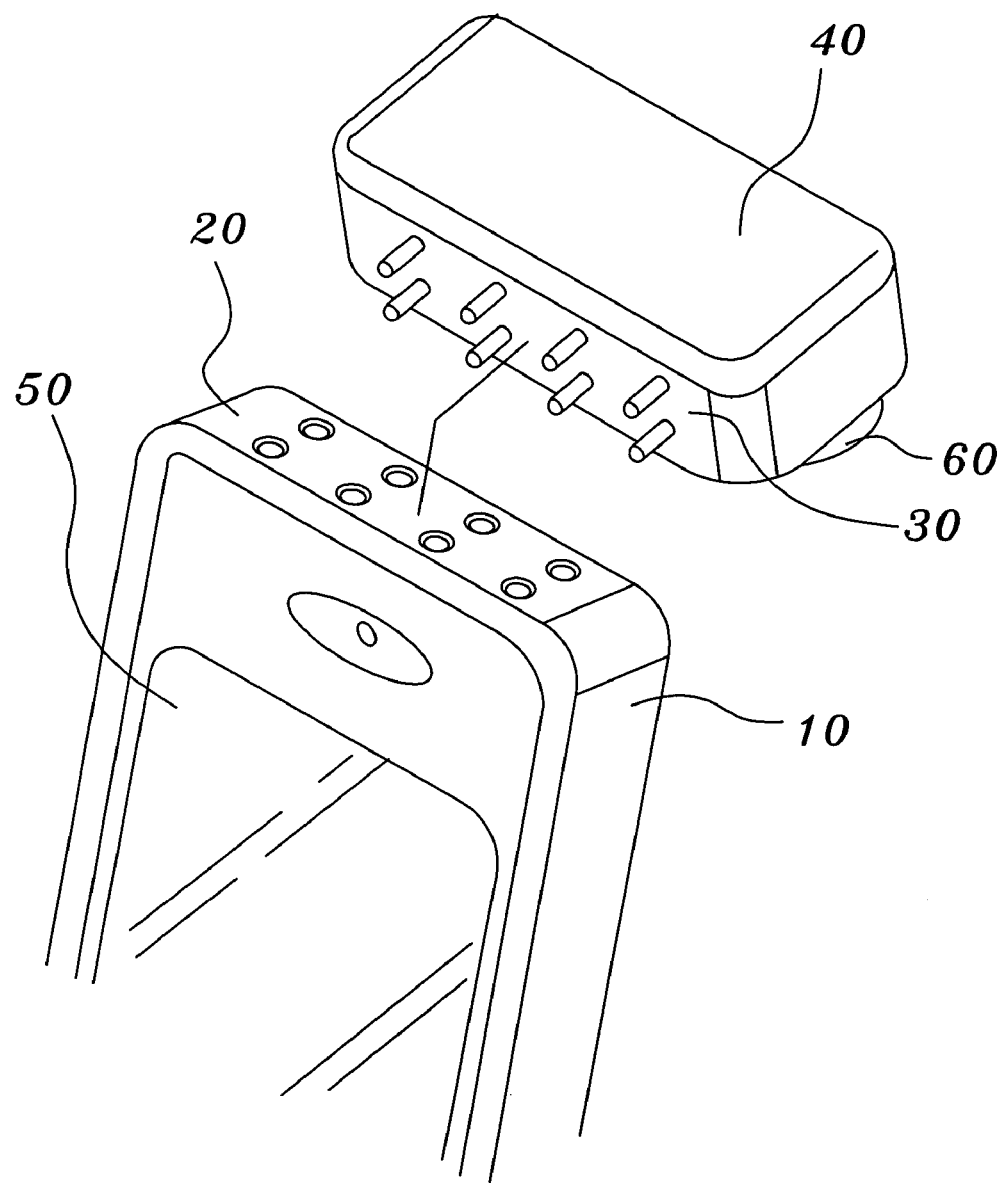
FIG. 2 is a 3 dimensional drawing of a mobile telephone and camera module connected via a versatile connector according to an embodiment of the present invention.

Refer to FIG. 2, which is a 3 dimensional drawing of a mobile telephone and camera module connected via a versatile connector according to an embodiment of the present invention.

When it is desired to photograph or record video data of objects other than the user, the camera module 40 is simple disconnected from the mobile telephone 10 and rotated 180 degrees so that the camera 40 is facing away from the screen 50 of the mobile phone 10.

In this way, a user can simply look at the screen 50 in order to observe the correct aiming of the camera module 40.

Figure 3:
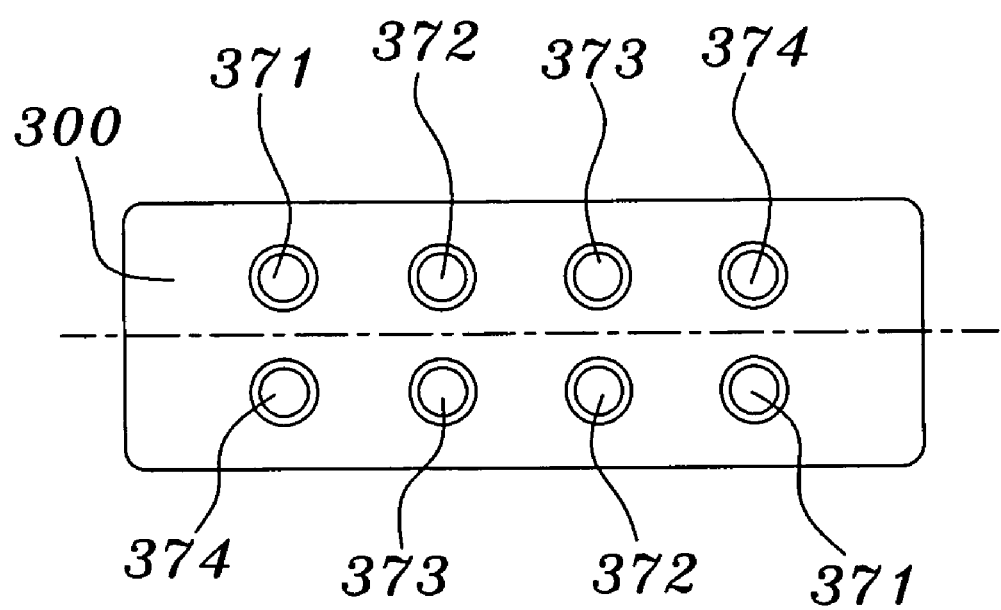
FIG. 3 is a drawing illustrating a versatile mobile phone and peripheral connector according to an embodiment of the present invention.

Refer to FIG. 3, which is a drawing illustrating a versatile mobile phone and peripheral connector according to an embodiment of the present invention.

In order to use the camera module and mobile phone to capture or record images and video, certain electrical connections must be made between the two devices.

The connector 300 comprises a plurality of contacts making these connections. These contacts are for a clock signal 371, an electrical ground 372, a power 373, and a data line 374.

Power from the battery of the mobile telephone is supplied to the camera module via the power contact 373 of the connector 300. The ground contact 372 provides a common ground level between the phone and the camera. Data, for example image data, flows between the camera and the phone via the data line 374. The clock signal 371 provides a clock signal in order to synchronize the data on the data line 374.

As illustrated in FIG. 3, in order to facilitate the 180-degree difference in orientation between the positions of the camera module, the pin-out of the connector is carefully laid out.

Figure 4A:
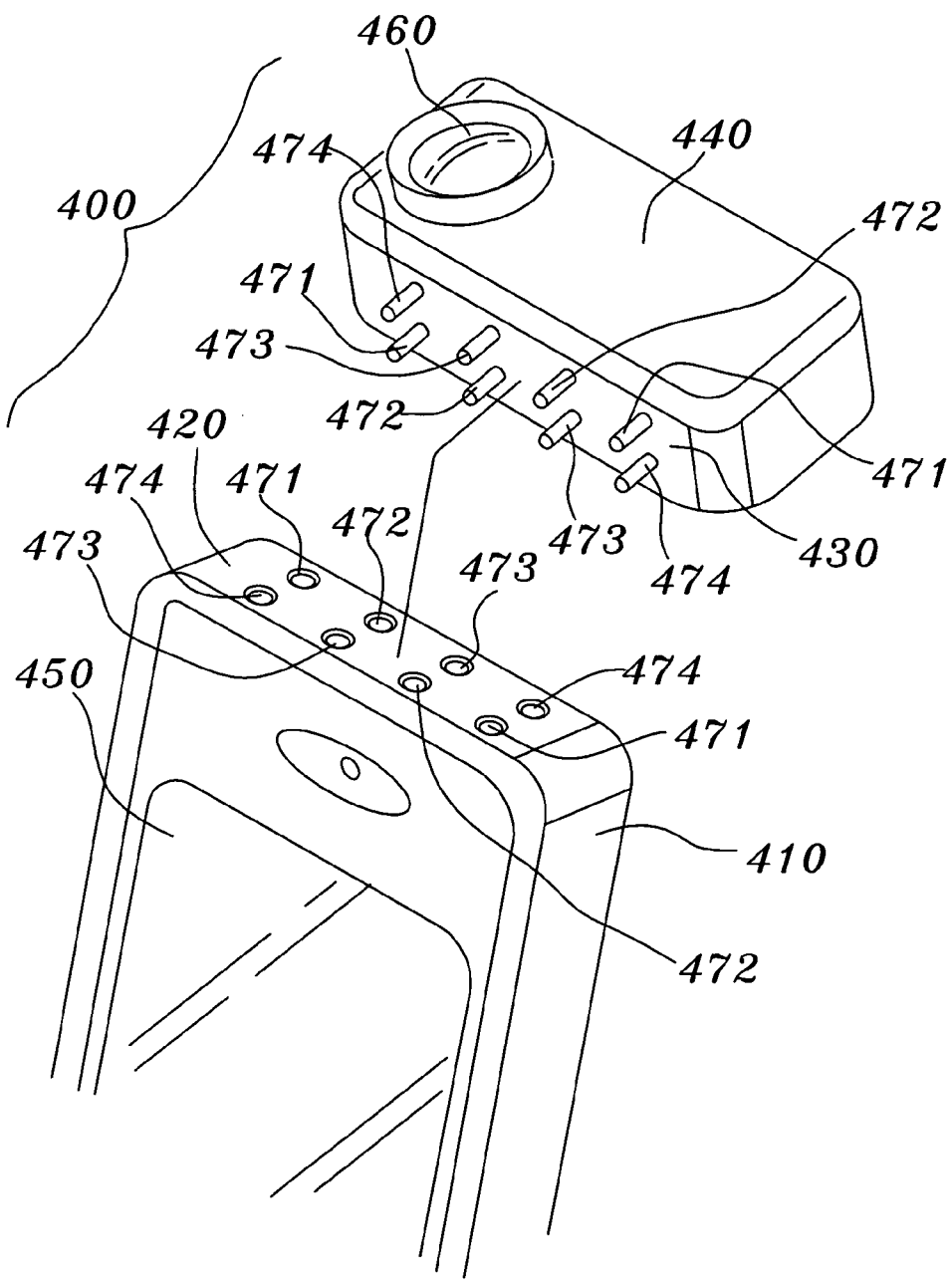
FIG. 4A is a 3 dimensional drawing illustrating a versatile mobile phone and peripheral connector according to an embodiment of the present invention.

Refer to FIG. 4A, which is a drawing illustrating a versatile mobile phone connector and peripheral connector according to an embodiment of the present invention.

To complete the connection between the mobile phone 410 and the camera module 440, the connectors 400 on both devices must mate in a complementary way. As described above, the phone connector 410 can be a female receptacle type connector and the camera connector 430 a male plug type connector. Alternatively, the phone connector 420 can be a male plug type connector and the camera connector 430 can be a female receptacle type connector.

The mating connectors 400 comprise a phone-side connector 420 and a peripheral-side connector 430. In this example, the phone-side connector 420 is a female receptacle type connector and the peripheral-side connector 430 is shown as a male plug type connector. However, the gender of these connectors can be reversed if desired.

The contacts for a clock signal 471, an electrical ground 472, a power 473, and a data line 474 on both connectors mate when connected.

Figure 4B:
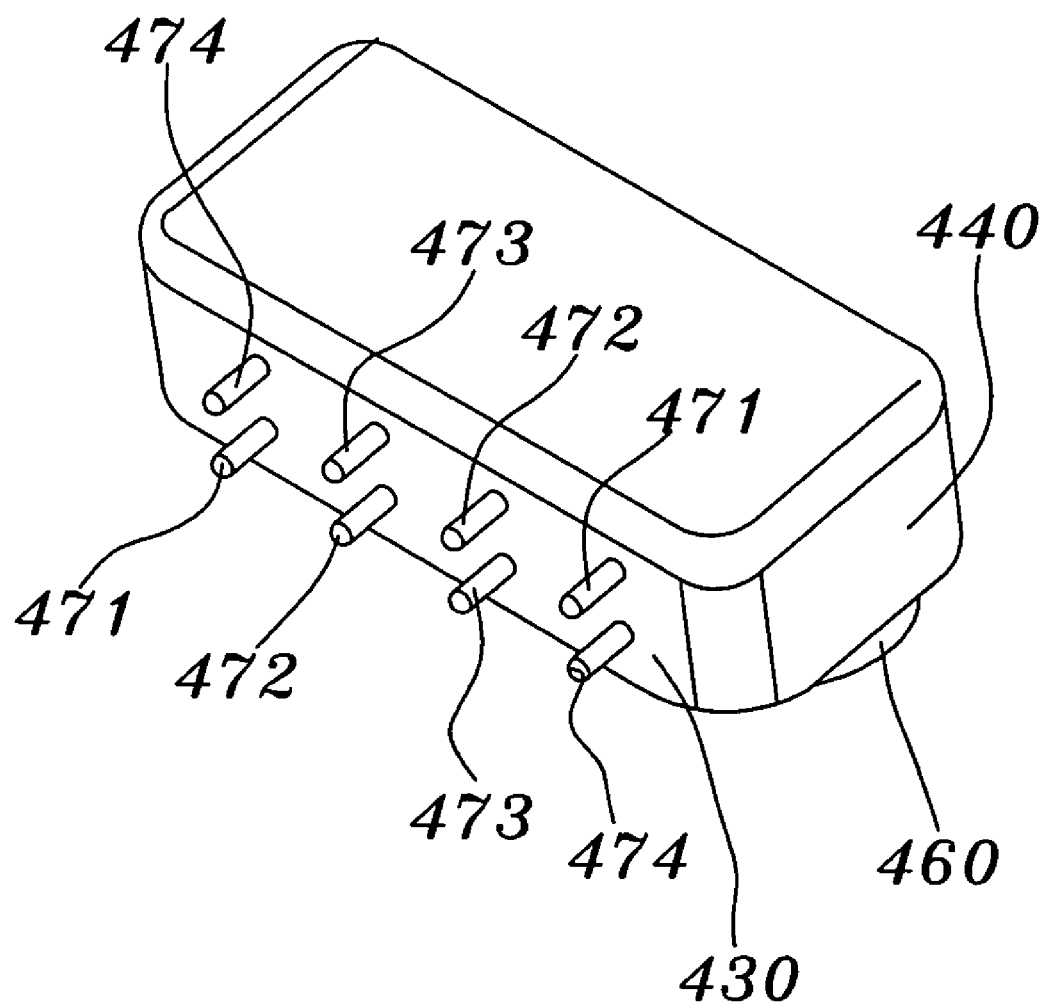
FIG. 4B is a 3 dimensional drawing illustrating a versatile mobile phone and peripheral connector according to an embodiment of the present invention.

Refer to FIG. 4B, which is a drawing illustrating a versatile mobile phone connector and peripheral connector according to an embodiment of the present invention.

As shown in FIG. 4B, when the camera module 440 is rotated 180 degrees so that the lens 460 of the camera module 440 is pointing away from the screen 450 of the mobile phone 410, the contacts for the clock signal 471, electrical ground 472, power 473, and a data line 474 on both connectors, still mate when connected.

The embodiments describe above discloses a connector with a single data line. However, in other embodiments of the present invention, a plurality of data lines is provided.

Figure 5:
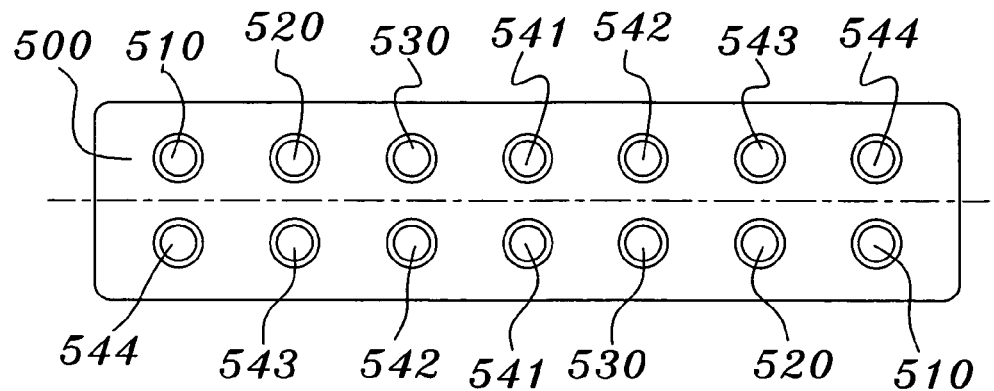
FIG. 5 is a drawing illustrating a versatile mobile phone and peripheral connector according to an embodiment of the present invention.

Refer to FIG. 5, which is a drawing illustrating a versatile mobile phone connector and peripheral connector according to an embodiment of the present invention.

As shown in FIG. 5, the connector 500 comprises a clock signal contact 510, a ground 520, a power 530, and four data lines; d0 541, d1 542, d2 543, and d3 544.

Figure 6:
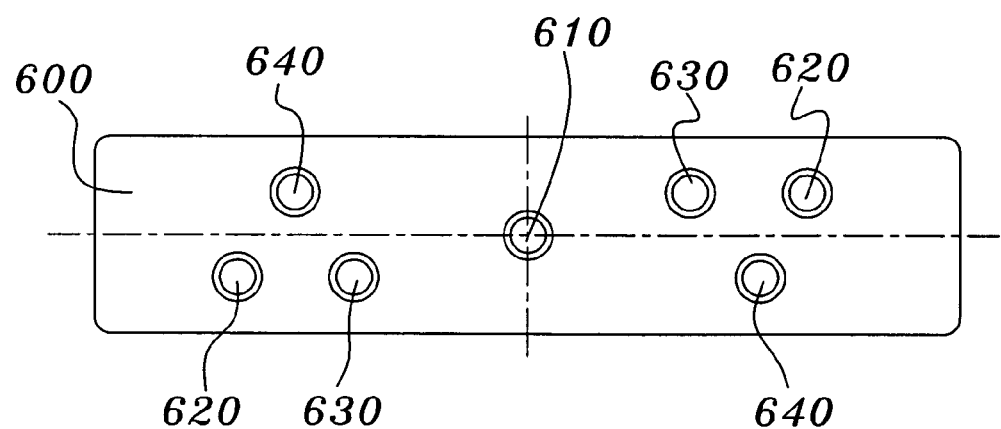
FIG. 6 is a drawing illustrating a versatile mobile phone and peripheral connector according to an embodiment of the present invention.

Refer to FIG. 6, which is a drawing illustrating a versatile mobile phone connector and peripheral connector according to an embodiment of the present invention.

To maximize efficiency and reduce complexity, one contact of the connector 600 can be positioned in the center of the connector 600. As a result, when the peripheral is rotated 180 degrees, the duplicate contact does not have to be supplied.

In this example, the center contact of the connector 600 is chosen to be the clock signal contact 610. The other contacts, ground 620, power 630, and data line 640 are situated around the clock signal contact 610, and duplicated so that when rotated 0 degrees or 180 degrees, the peripheral side connector and the phone-side connector will still mate.

In this way, a duplicate contact for the center pin is eliminated, thus lowering costs.

It should be noted that the arrangement of these contacts could be situated in any order as long as their mating contact on the other connector will properly mate with it regardless of orientation. For example, the previous examples have situated the duplicate set of contacts dispersed along the centerline of the width of the connector. However, in other embodiments the duplicate set of contacts is dispersed across the centerline of the depth of the connector.

Figure 7A:
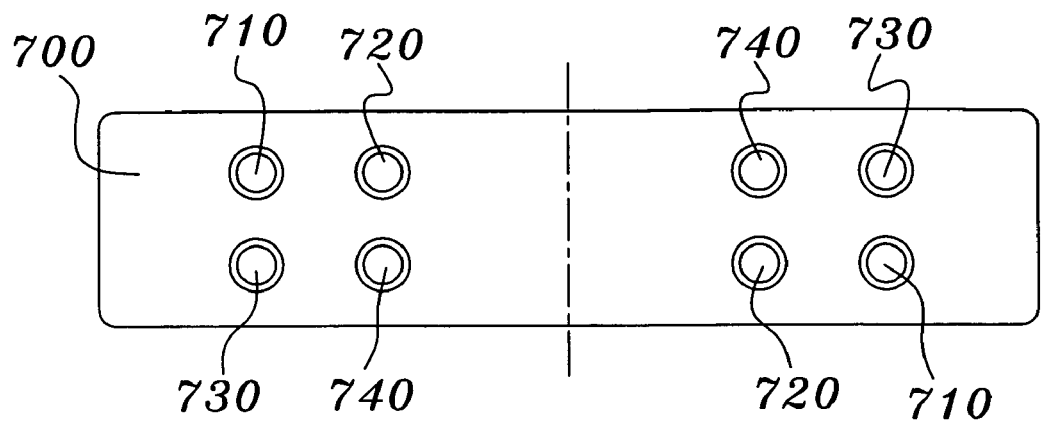
FIG. 7A is a drawing illustrating a versatile mobile phone and peripheral connector according to an embodiment of the present invention.

Refer to FIG. 7A, which is a drawing illustrating a versatile mobile phone connector and peripheral connector according to an embodiment of the present invention.

In the embodiment illustrated in FIG. 7A, the arrangement of the contacts are according to the centerline of the depth of the connector 700. One group of contacts is situated on one half of the connector 700 and the duplicate set on the other. The connector 700 still provides a clock signal contact 710, ground 720, power 730, and a data line 740. Even when the peripheral is rotated either 0 degrees or 180 degrees, the mating contacts on the other connector still mate properly.

Figure 7B:
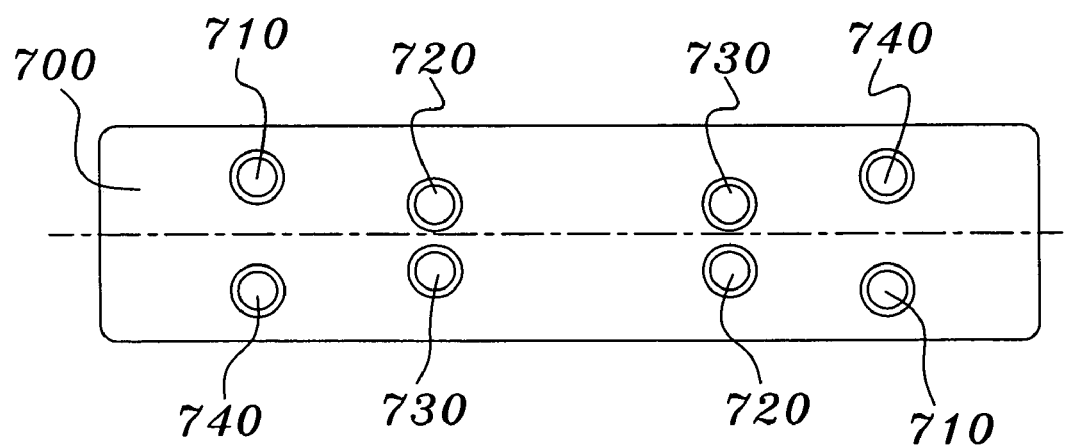
FIG. 7B is a drawing illustrating a versatile mobile phone and peripheral connector according to an embodiment of the present invention.

Refer to FIG. 7B, which is a drawing illustrating a versatile mobile phone connector and peripheral connector according to an embodiment of the present invention.

Furthermore, the arrangement of the contacts does not have to be in a straight line. As shown in FIG. 7B, the contacts, clock signal 710, ground 720, power 730, and data 740 are arranged in different lines. Obviously, different patterns or arrangement are within the scope of the invention.

Figure 8:
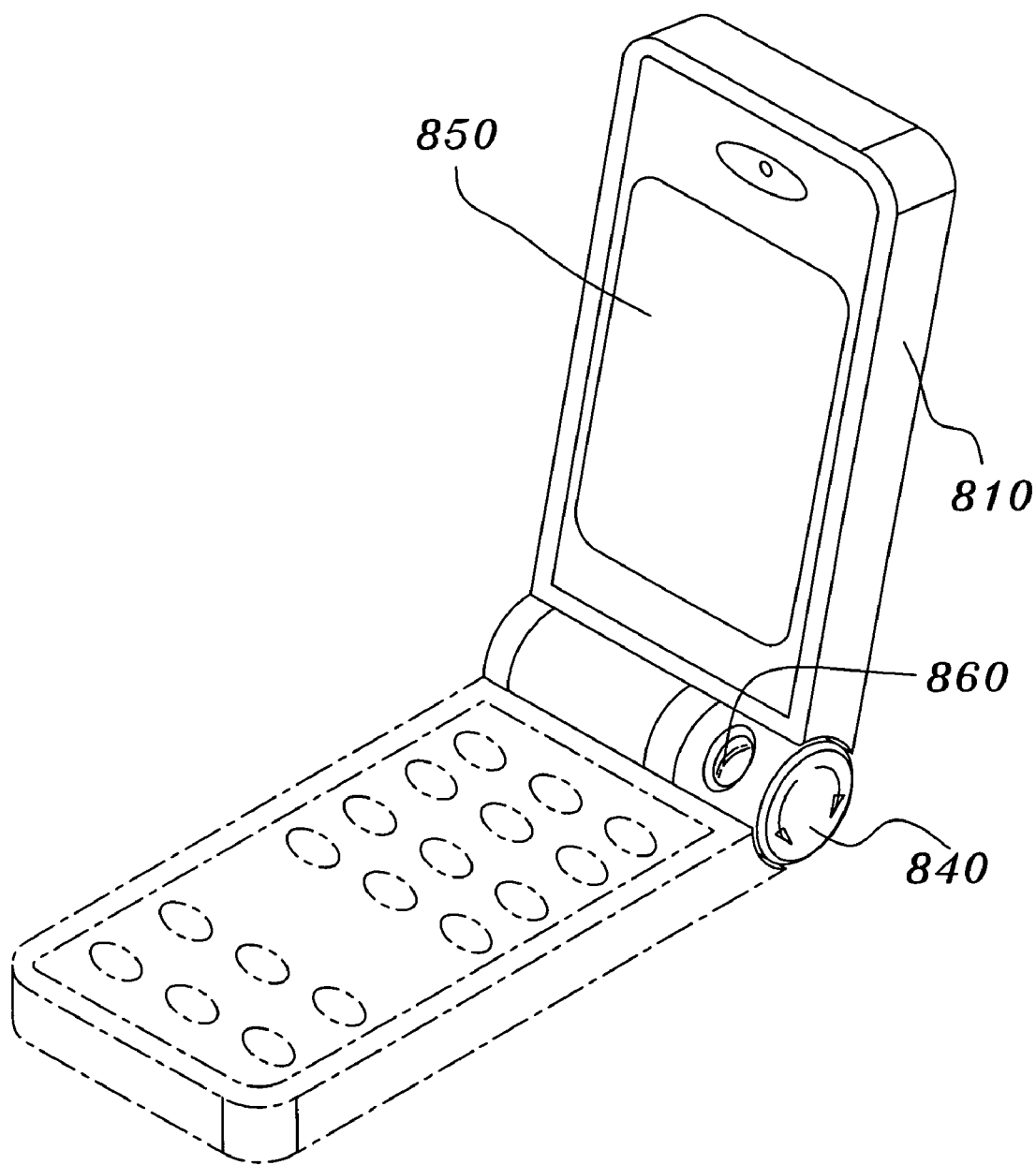
FIG. 8 is a 3 dimensional drawing of a mobile telephone with attached camera module.
Figure 9A:
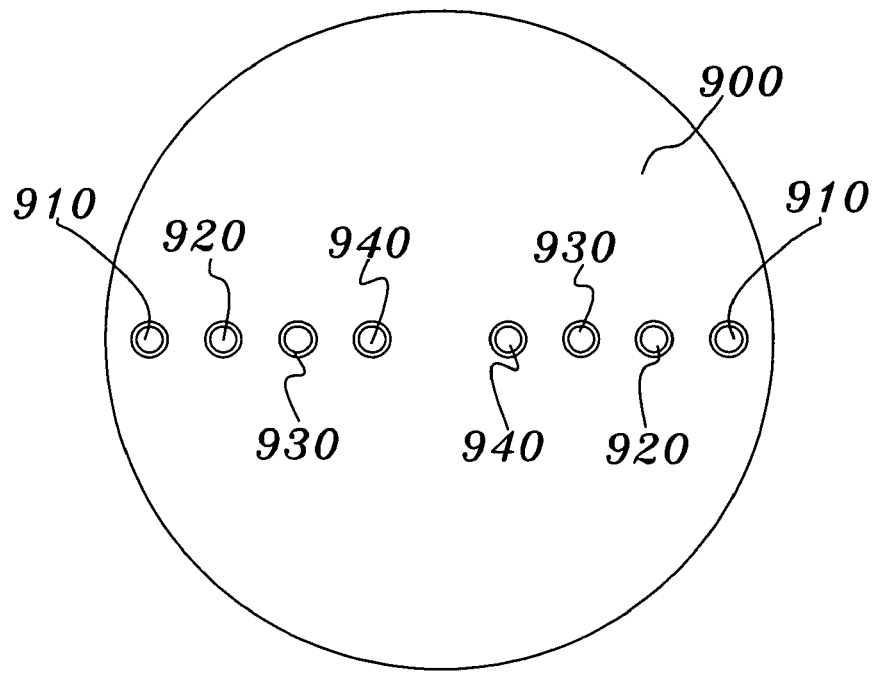
FIG. 9A is a drawing illustrating a versatile mobile telephone and peripheral connector according to an embodiment of the present invention.

Refer to FIG. 8, which is a 3 dimensional drawing of a mobile telephone with attached camera module, and to FIG. 9A, which is a drawing illustrating a versatile mobile telephone and peripheral connector according to an embodiment of the present invention.

As shown in FIG. 8, the mobile telephone 810 comprises a camera module 840 rotatably attached to the telephone 810. When the user desires to photograph an object other than the user, the camera module 840 is rotated 180 degrees so that the lens 860 points away from the screen 850.

As shown in FIG. 9A, the connector between the camera module and the telephone comprises a plurality of contacts. Following the previous examples, a clock signal 910, ground 920, power 930, and data 940 contacts are provided. When the camera module is rotated 180 degrees, the mating contacts still properly mate.

Figure 9B:
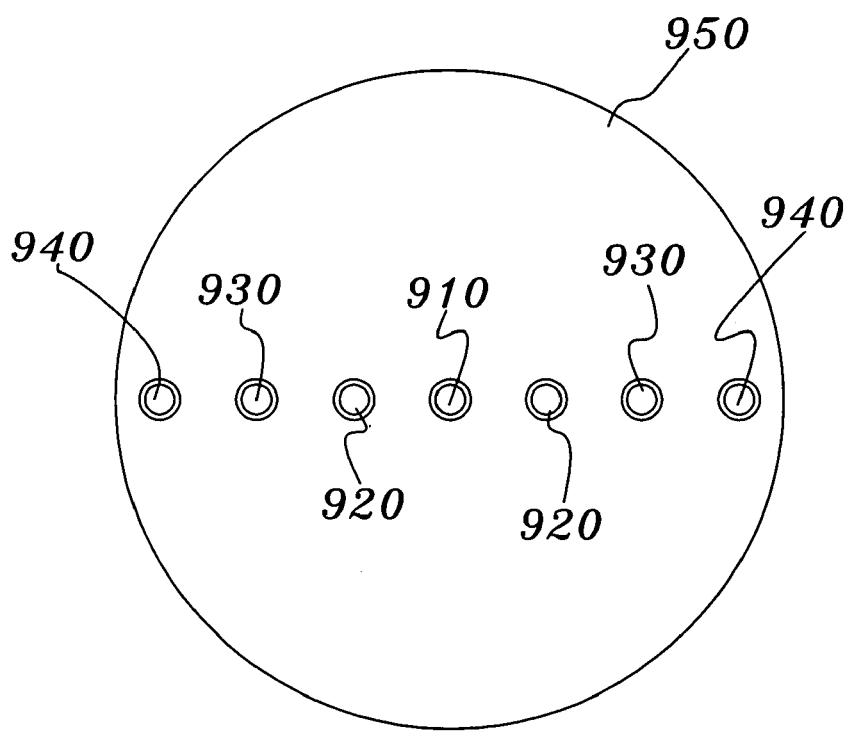
FIG. 9B is a drawing illustrating a versatile mobile telephone and peripheral connector according to an embodiment of the present invention.

Refer to FIG. 9B, which is a drawing illustrating a versatile mobile phone connector and peripheral connector according to an embodiment of the present invention.

In order to reduce costs and complexity, one of the contacts can be situated in the center so that it does not have to be duplicated. In this example, the clock signal 910 was chosen, but obviously other contacts can be selected to be situated in the center.

Figure 10:
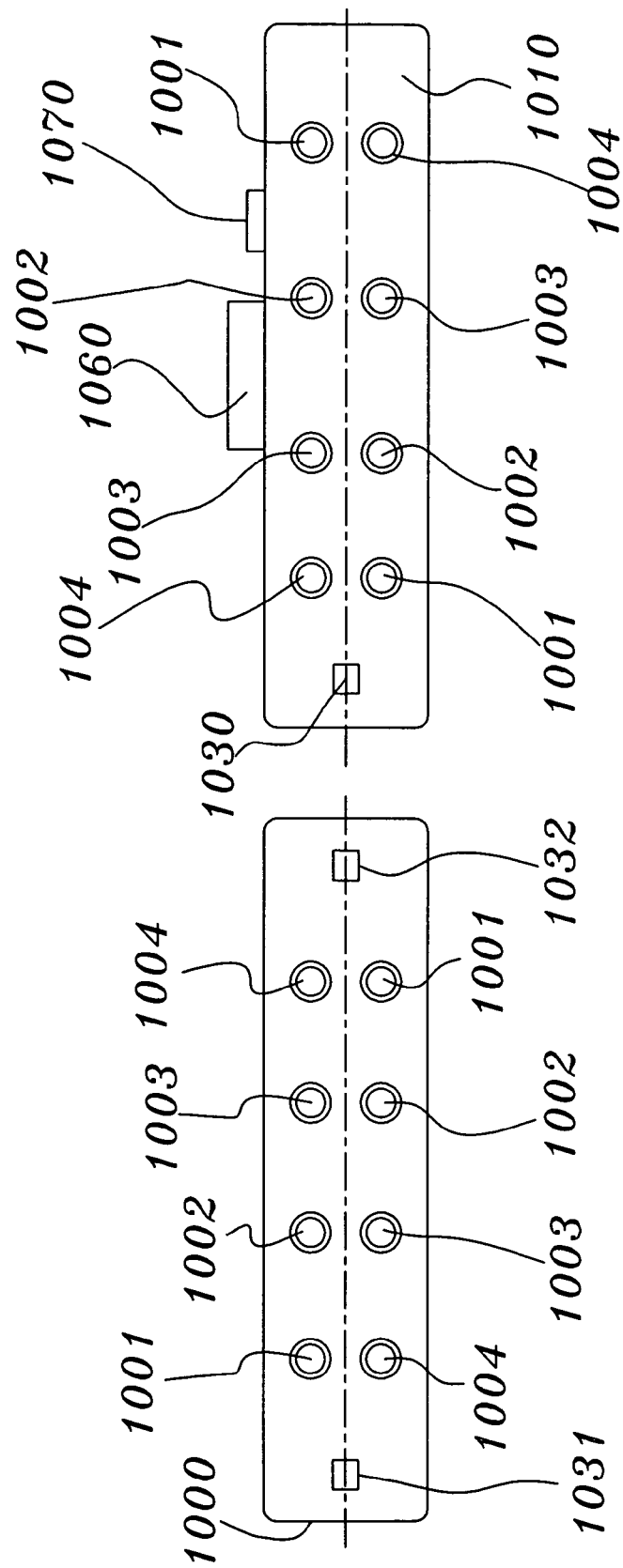
FIG. 10 is a drawing illustrating a versatile mobile telephone and peripheral connector according to an embodiment of the present invention.

Refer to FIG. 10, which is a drawing illustrating a versatile mobile phone connector and peripheral connector according to an embodiment of the present invention.

In the previous embodiments and examples, the orientation of the peripheral is not important as the provided contacts are duplicated for a 0 degree and 180 degree orientation.

However, in other applications it may be necessary to obtain the orientation of the peripheral. For example, with a strobe flash attached to the camera module, when the camera is pointed away from the user or screen, a normal flash is provided to illuminate the object or objects to be captured. However, when the camera is orientated so that it faces the user, the distance from the lens is shorter. As a result, the length or brightness of the flash required is different. If the same flash is used, the captured image of the user may appear to be too bright or washed out. Therefore, a shorter or less powerful flash can be provided for this orientation.

In order to automatically determine the orientation of the peripheral, the phone side connector 1000 comprises a first orientation contact 1031 and a second orientation contact 1032, in addition to the clock signal 1001, ground 1002, power 1003, and data 1004 contacts.

The camera side connector 1010 comprises a position contact 1030. In this way, when the lens 1060 and flash 1070 are pointed away from the user, the position contact 1030 will mate with the second orientation contact 1032 of the telephone connector 1000. When the lens is pointed towards the user, the position contact 1030 will mate with the first orientation contact 1031. As a result, the orientation of the peripheral can easily be obtained.

Figure 11A:
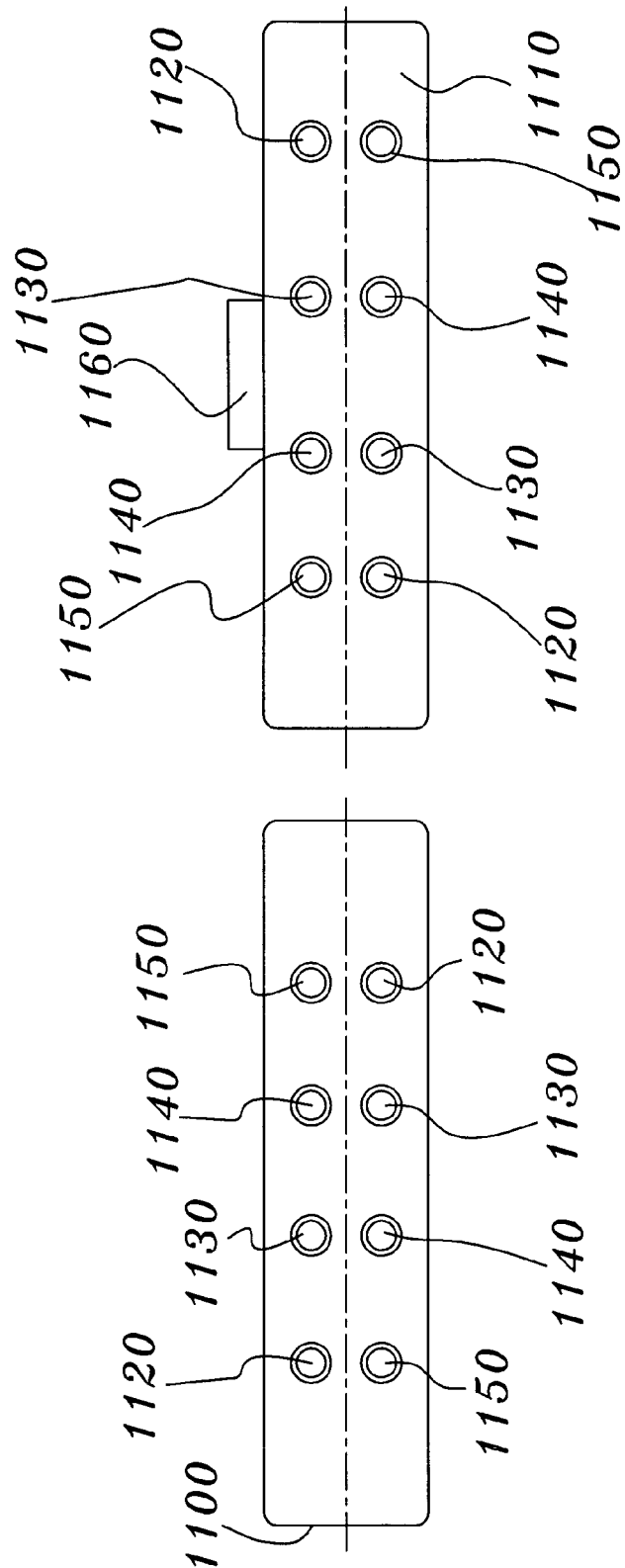
FIGS. 11A, 11B, and 11C are drawings illustrating a versatile mobile telephone and peripheral connector according to embodiments of the present invention.
Figure 11B:
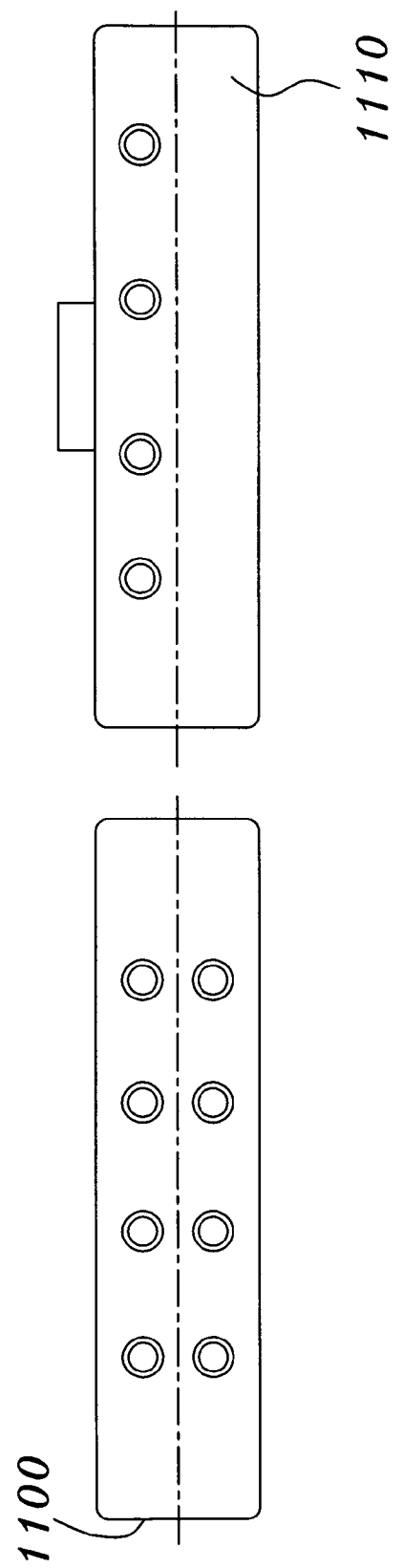
Figure 11C:
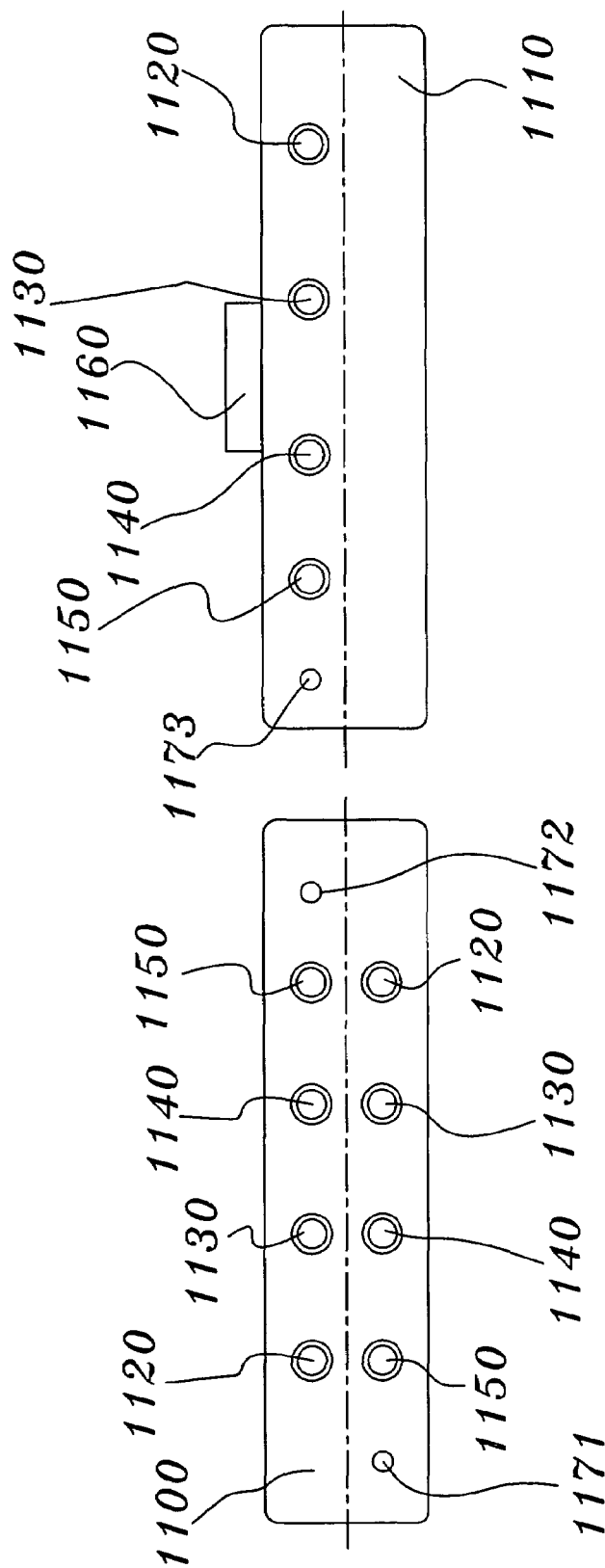

Refer to FIGS. 11A, 11B, and 11C, which are drawings illustrating a versatile mobile phone connector and peripheral connector according to an embodiment of the present invention.

As shown in FIG. 11A, the phone-side connector 1100 comprises a plurality of contacts 1120, 1130, 1140, and 1150 which are duplicated adjacent to the contacts but in a reverse order. The camera-side connector 1110 also comprises a plurality of mating contacts 1150, 1140, 1130, and 1120 which are duplicated adjacent to the contacts but in a reverse order. In this way, the phone-side connector 1100 and the camera-side connector can properly mate regardless of the orientation (either facing towards or away from the mobile phone user.

In order to reduce cost, the duplicate set of contacts on the camera-side connector can be eliminated as shown in FIG. 11B. While this embodiment still allows for the camera to face towards or away from the user, the user must exercise some care so that the camera is connected properly. Typically, improperly connecting the camera in this manner would not damage the camera, but the camera would not function properly.

Therefore, in an embodiment as shown in FIG. 11C, the phone-side connector 1100 further comprises a first locator 1171 and a second locator 1172. Note, while these locators 1171, 1172, can be electrical contacts, it is not necessary to be so. They can simply be holes or indentations. The camera-side connector 1110, while eliminating the duplicate set of contacts, further comprises an identifier 1173. For example, the first locator 1171 and the second locator 1172 can be indentations in the connector 1100 and the identifier 1173 can be a post protruding from the camera-side connector 1110.

In this way, when the camera module is connected to the phone and facing away from the user, the identifier 1173 will seat into the second locator 1172. When the lens 1160 is facing the user, the identifier 1173 will seat into the first locator 1171. Due to the positioning of the locators 1171, 1172, and the identifier 1173, it is impossible for the user to attach the peripheral incorrectly.

Note that the above example utilized a camera module as the peripheral, however, other peripherals utilizing the connector of the present invention can be used.

Also, additional or different contacts can be provided as required. For example, a microphone or audio input line, or a flash strobe pulse line for firing a flash on the camera module could also be provided.

Additionally, as noted above, the gender of each side of the connector can be selected according to requirements.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A connector for connecting two electronic devices comprising;
   a first connector comprising:
      a plurality of first contacts; and
      a duplicate set of first contacts arranged in parallel and in a reverse order with the plurality of first contacts;
   a second connector comprising:
      a plurality of second connector contacts, wherein the plurality of second connector contacts mate with the plurality of first contacts in a first orientation, and the plurality of second connector contacts mate with the duplicate set of first contacts in a second orientation; and
   means for ensuring the plurality of second connector contacts do not mate with the duplicate set of first contacts in a first orientation, and the plurality of second connector contacts do not mate with the plurality of first contacts in a second orientation.

2. The connector for connecting two electronic devices of claim 1, wherein the first contacts comprise a power contact, a ground contact, a clock signal contact, and at least one data contact.

3. The connector for connecting two electronic devices of claim 1, further comprising a means for determining the orientation of the second connector.

4. The connector for connecting two electronic devices of claim 1, wherein the first connector is female and the second connector is male.

5. The connector for connecting two electronic devices of claim 1, wherein the first connector is attached to a mobile telephone and the second connector is attached to a peripheral.

6. A connector for providing multiple orientations of a connected object comprising:
   a first connector comprising:
      a plurality of first contacts; and
      a plurality of second contacts; and
   a second connector comprising:
      a plurality of third contacts, wherein the plurality of third contacts mate with the plurality of first contacts in a first orientation, and the plurality of third contacts mate with the plurality of second contacts in a second orientation; and
   means for ensuring the plurality of third contacts do not mate with the plurality of second contacts in a first orientation, and the plurality of third contacts do not mate with the plurality of first contacts in a second orientation.

7. The connector for providing multiple orientations of a connected object of claim 6, wherein the first contacts comprise a power contact, a ground contact, a clock signal contact, and at least one data contact.

8. The connector for providing multiple orientations of a connected object of claim 6, wherein the second contacts are arranged in parallel with the first contacts but in a reverse order.

9. The connector for providing multiple orientations of a connected object of claim 6, further comprising a means for determining the orientation of the second connector.

10. The connector for providing multiple orientations of a connected object of claim 6, wherein the first connector is female and the second connector is male.

11. The connector for providing multiple orientations of a connected object of claim 6, wherein the first connector is attached to a mobile telephone and the second connector is attached to a peripheral.

12. A connector for connecting a peripheral to a mobile telephone comprising:
   a first connector of a first gender comprising;
      a first connector clock signal contact;
      a duplicate first connector clock signal contact;
      a first connector ground contact;
      a duplicate first connector ground contact;
      a first connector power contact;
      a duplicate first connector power contact;
      at least one first connector data contact; and
      at least one duplicate first connector data contact; and
   a second connector of a second gender comprising;
      a second connector clock signal contact;
      a duplicate second connector clock signal contact;
      a second connector ground contact;
      a duplicate second connector contact;
      a second connector power contact;
      a duplicate second connector power contact;
      at least one second connector data contact; and
      at least one duplicate second connector data contact.

13. The connector for connecting a peripheral to a mobile telephone of claim 12, wherein the first gender is female and the second gender is male.

14. The connector for connecting a peripheral to a mobile telephone of claim 12, wherein the first connector is attached to the mobile telephone and the second connector is attached to the peripheral.

15. The connector for connecting a peripheral to a mobile telephone of claim 12, wherein the duplicate contacts are arranged in parallel to the other contacts on the same connector.

16. The connector for connecting a peripheral to a mobile telephone of claim 12, wherein the duplicate contacts are arranged in reverse order to the other contacts on the same connector.

17. The connector for connecting a peripheral to a mobile telephone of claim 12, further comprising a means for determining the orientation of the second connector.

18. The connector for connecting a peripheral to a mobile telephone of claim 12, further comprising:
   a first connector first orientation contact;
   a first connector second orientation contact; and
   a second connector position contact;
      whereby the second position contact mates with the first connector first orientation contact when the second connector is in a first orientation; and
      whereby the second position contact mates with the first connector second orientation contact when the second connector is in a second orientation.

* * * * *